(12) United States Patent
Niktash

(10) Patent No.: US 7,701,379 B2
(45) Date of Patent: Apr. 20, 2010

(54) MOTION COMPENSATION FOR RADAR IMAGING

(75) Inventor: Afshin Niktash, Irvine, CA (US)

(73) Assignee: Tialinx, Inc., Irvine, CA (US)

( * ) Notice: Subject to any disclaimer, the term of this patent is extended or adjusted under 35 U.S.C. 154(b) by 0 days.

(21) Appl. No.: 12/198,291

(22) Filed: Aug. 26, 2008

(65) Prior Publication Data

US 2010/0052969 A1 Mar. 4, 2010

(51) Int. Cl.
*G01S 13/00* (2006.01)
(52) U.S. Cl. ............................. 342/22; 342/27; 342/159
(58) Field of Classification Search .................... 342/22, 342/27, 159
See application file for complete search history.

(56) References Cited

U.S. PATENT DOCUMENTS 5,327,139 A * 7/1994 Johnson ........................ 342/22
5,952,954 A * 9/1999 Beckner ....................... 342/22

* cited by examiner

Primary Examiner—Thomas H Tarcza
Assistant Examiner—Timothy A Brainard
(74) Attorney, Agent, or Firm—Haynes and Boone, LLP

(57) ABSTRACT

In one embodiment, a radar is provided that is configured to construct an image of a target within or adjacent to a substrate according to scan points associated with a surface of the substrate while the radar is scanned in a first direction. The radar includes a transceiver that transmits radar pulses and receives reflected radar pulses using an antenna directed at the surface; and an image processor configured to use a plurality of processed received radar pulses to generate an image portion according to each scan point; and at least one laser range finder being configured to illuminate a first surface portion within a surface portion illuminated by the antenna and to illuminate a second surface portion displaced in the first direction from the first surface portion, the laser range finder determining a first range between the laser range finder and the first surface portion and determining a second range between the laser range finder and the second surface portion, wherein the radar is configured to process the first and second ranges to determine a range translation of the radar during the scan in the first direction, and wherein the image processor is further configured to compensate the image portions according to the determined range translation so at construct an image of the target.

17 Claims, 9 Drawing Sheets

MOTION COMPENSATION FOR RADAR IMAGING

TECHNICAL FIELD

This application relates to radar and more particularly to a motion compensation technique for radar imaging.

BACKGROUND

See-through-wall and Ground Penetrating Radars (GPR) have broad civilian and military applications in finding objects or explosives such as Improvised Explosive Devices (IEDs) inside or behind walls or buried under ground. The radar transmits impulses or continuous waveforms that can penetrate soil, concrete, glass or wood and captures the reflected signals. The time difference between transmission of a waveform and reception of the reflected signals (round-trip time) as well as amplitude and phase information are utilized to detect the target range and to identify the target from its cross section. In more advanced radars, a signal processor is employed to construct a 2-D or 3-D image of the scanned area using the reflected pulses from the target. For example, land-survey GPRs are mounted on a vehicle to scan the roads to explore the subsurface of the ground. An example GPR scan scenario is illustrated in FIG. 1a, which shows a GPR 100 scanning in the x direction at various scan points. A radar beam from GPR 100 propagates into the ground in the y direction, which contains a buried target 105. At every scan point GPR 100 emits radar pulses and records the received reflected pulses, which come from different depths to thereby allow an imaging of the ground. The GPR performs the appropriate signal processing on the returned pulses to transform the information into a two-dimensional (2-D) image as seen in FIG. 1b. The translation of the GPR in the x-direction (which is the scan speed) is typically on the order of a few miles per hour. To precisely map an area, the scan points should be as close as possible to each other, provided that the antenna beam is narrow. To construct the RF image, the radar antenna distance to the ground should be unchanged during the scan and the scan speed should also be constant. Any translation of the GPR in range with respect to the target (in this example, in the y-direction) will result in variations in round-trip time of transmitted pulses which translate to changes in detected depths of different points of an object.

FIG. 2a illustrates the errors introduced by a translation of GPR 100 in range (in this example, the y direction) with respect to the target as it scans. Although the target is unchanged from FIG. 1a, the resulting radar image of the ground shown in FIG. 2b indicates a concavity in the target (and the ground surface) corresponding to a mirror image of the y-direction translation of the radar. Such fluctuations in the height of the radar as it scans are inevitable if the radar is hand-held or transported by a helicopter or other type of aircraft. Moreover, even if the radar is mounted on a vehicle, it will have height variations as the suspension accommodates rocks and other uneven terrain.

Variations in the speed of the vehicle also affect the quality of the produced images by introducing uncertainty in the exact position of scan points along the scan path. More specifically, the constructed image and targets dimensions will be unevenly skewed or smeared responsive to the scan speed variations. To alleviate this problem, vehicle speed data are fed to the radar by a tachometer attached to a wheel or through an analog/digital interface to the vehicle's speedometer to calculate the relative position of each scan point. This method develops inaccuracies as the position error will accumulate through the scan. Moreover, radar scan speed is typically greater than the response time of conventional vehicle-mounted speedometers, especially tachometers such that the position information associated with every scan point may not be updated accordingly. The above mentioned problems are more serious for hand-held radars as the scanner motion is solely controlled by the operator's skills. Uneven speed of manually sliding the scanner over the target and operator's hand vibrations and unintentional drifts in the radar distance to the surface during the scan result in significant degradation in image quality.

Accordingly, there is a need in the art for radars which compensate for range translation as they scan. In addition, there is a need in the art for radars which compensate for scan speed variations.

SUMMARY

In accordance with an aspect of the invention, a radar range compensation method is provided that includes the acts of: scanning a radar in a first direction with respect to a surface of a substrate, the radar being configured to construct an image of objects within the substrate according to scan points associated with the surface; while scanning the radar in the first direction, determining a range between the radar and a current scan point as well as determining the range between the radar and a future scan point displaced from the current scan point in the first direction; processing the determined ranges to estimate a range translation of the radar during the scan; and constructing the image of the objects according to the scan points while compensating for the range translation of the radar.

In accordance with another aspect of the invention, a radar compensation method, is provided that includes the acts of: scanning a radar in a first direction with respect to a surface of a substrate, the radar being configured to construct an image of a target within or adjacent to the substrate according to scan points associated with the surface; while scanning the radar in the first direction, determining a first acceleration of the radar in the first direction and a second acceleration of the radar towards the surface; processing the first and second accelerations to determine a variation of the radar from a constant scan speed and to determine a range translation of the radar with respect to the surface; and constructing the image of the target according to the scan points while compensating for the variation of the radar from the constant scan speed as well as compensating for the range translation of the radar.

In accordance with another aspect of the invention, a radar is provided that is configured to construct an image of a target within or adjacent to a substrate according to scan points associated with a surface of the substrate while the radar is scanned in a first direction. The radar includes a transceiver that transmits radar pulses and receives reflected radar pulses using an antenna directed at the surface; and an image processor configured to use a plurality of processed received radar pulses to generate an image portion according to each scan point; and at least one laser range finder being configured to illuminate a first surface portion within a surface portion illuminated by the antenna and to illuminate a second surface portion displaced in the first direction from the first surface portion, the laser range finder determining a first range between the laser range finder and the first surface portion and determining a second range between the laser range finder and the second surface portion, wherein the radar is configured to process the first and second ranges to determine a range translation of the radar during the scan in the first direction, and wherein the image processor is further configured to compensate the image portions according to the determined range translation so as to construct an image of the target.

The invention will be more fully understood upon consideration of the following detailed description, taken together with the accompanying drawings.

BRIEF DESCRIPTION OF THE DRAWINGS

FIG. 1b illustrates a resulting radar image of the target from the scan of FIG. 1a.

FIG. 2b illustrates a resulting radar image having range distortions from the range translations in the scan of FIG. 2a.

Embodiments of the present invention and their advantages are best understood by referring to the detailed description that follows. It should be appreciated that like reference numerals are used to identify like elements illustrated in one or more of the figures.

DETAILED DESCRIPTION

Reference will now be made in detail to one or more embodiments of the invention. While the invention will be described with respect to these embodiments, it should be understood that the invention is not limited to any particular embodiment. On the contrary, the invention includes alternatives, modifications, and equivalents as may come within the spirit and scope of the appended claims. Furthermore, in the following description, numerous specific details are set forth to provide a thorough understanding of the invention. The invention may be practiced without some or all of these specific details. In other instances, well-known structures and principles of operation have not been described in detail to avoid obscuring the invention.

Figure 1B:
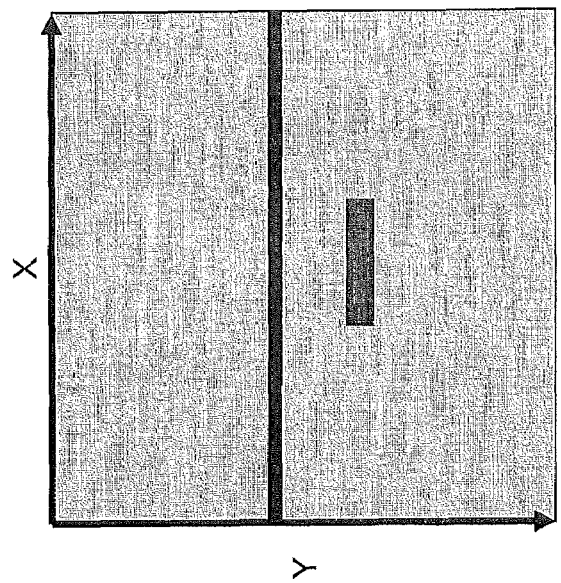
Figure 1A:
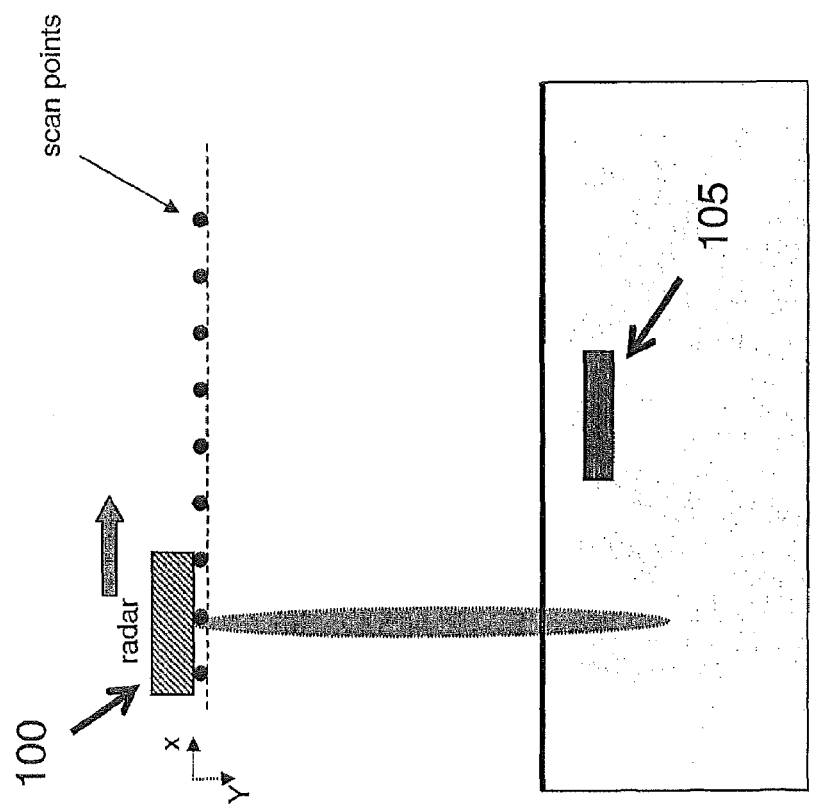
FIG. 1a illustrates a ground penetrating radar (GPR) scanning a buried target without height or scan speed fluctuations.
Figure 2B:
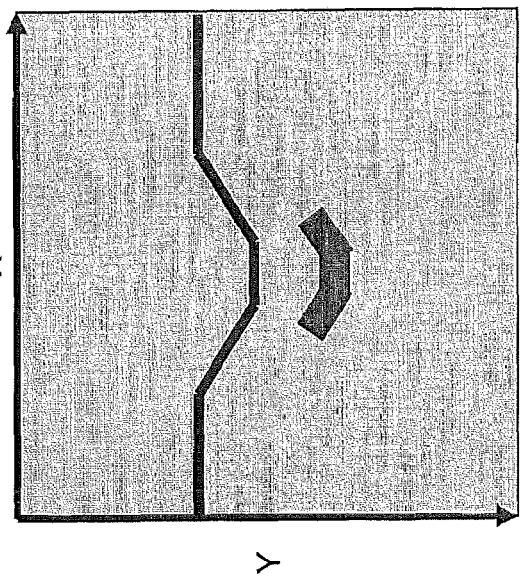
Figure 2A:
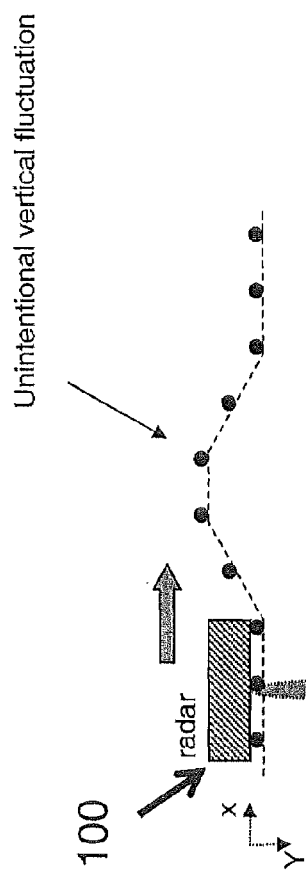
FIG. 2a illustrates the GPR scanning the buried target while the GPR is translated in range with respect to the target.
Figure 2A:
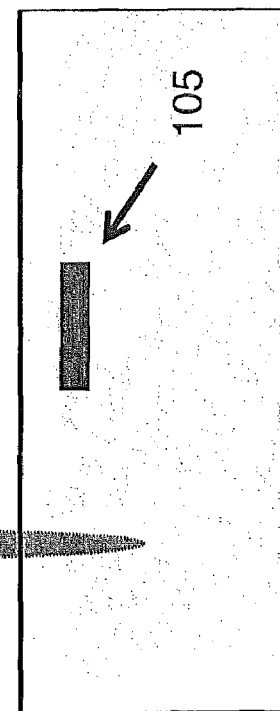
Figure 3:
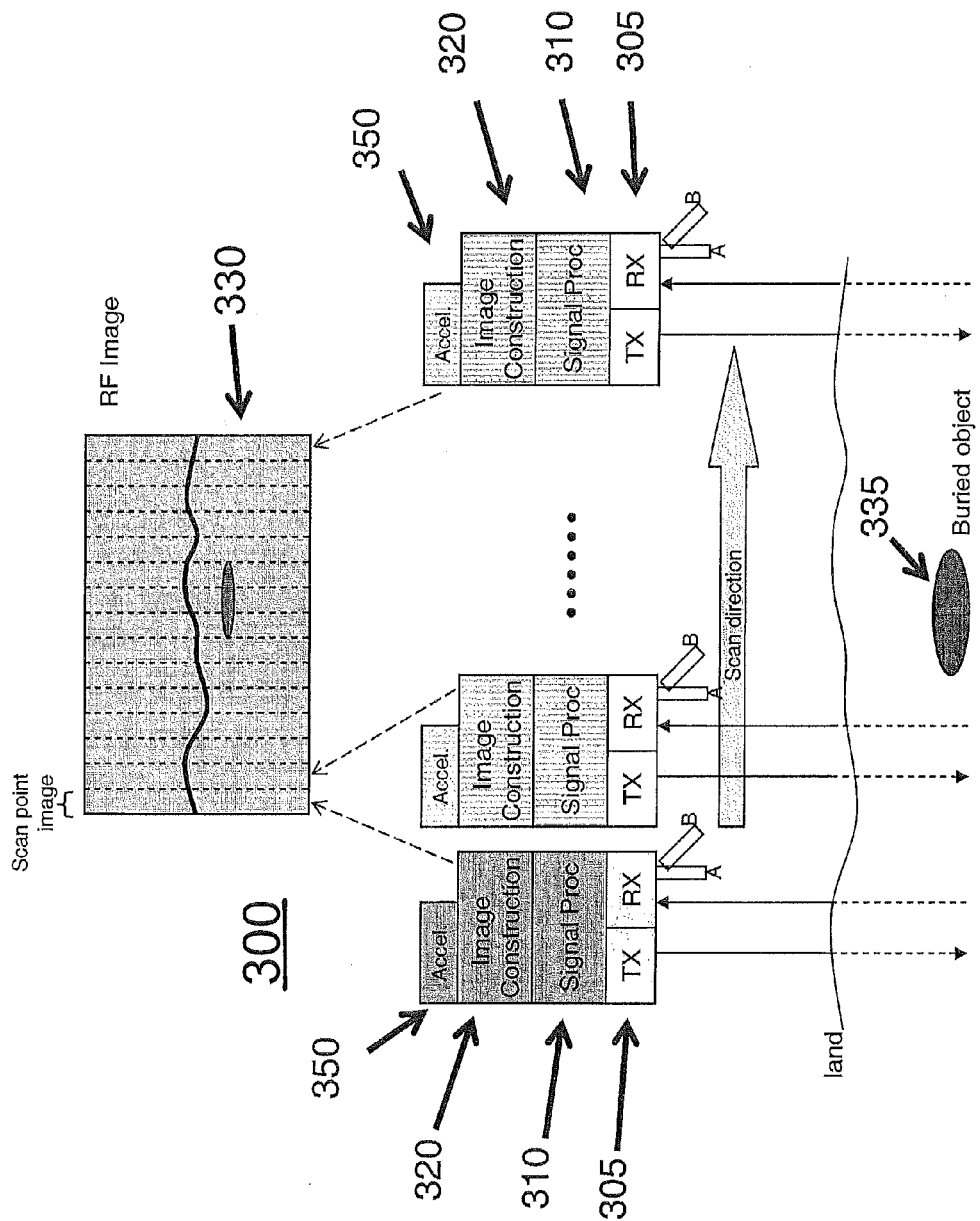
FIG. 3 illustrates a GPR scanning the ground and a resulting image from this scan, where the GPS compensates for range translation using multiple laser range finders.

As described earlier, translations of a radar in range with respect to a target distort the resulting RF image representation of the target because the apparent range to the target is affected by the range translation of the radar. This range translation occurs along in the antenna boresight direction, assuming the radar is scanned such that its radar beam propagates orthogonally to the ground surface (or to the wall surface in a see-through-wall application). The radar beam is directed at the ground such that a surface of the ground is illuminated by the radar beam. To address distortion in a target image resulting from range translation during scanning, a radar is provided that includes a laser range finder that determines the range to the surface for both the current surface illumination spot as well as the range to the surface for a future illumination spot. FIG. 3 illustrates a scan by an example range-translation-compensating radar 300.

As known in the ground-penetrating radar arts, radar 300 includes a transceiver 305 that transmits and receives radar pulses. The received pulses are processed by a signal processor 310 (such as by using correlation, integration, and filtering) and the resulting processed pulses are further processed by an image processor 320 to provide an RF image 330 of the ground and a buried object 335. A ground penetrating radar (GPR) will typically have a pulse repetition frequency in the mega-Hertz (MHz) range. But due to the very low signal-to-noise ratio for the reflected pulses because of the losses in propagating through the ground, many reflected pulses must be integrated and processed by an image reconstruction algorithm running within processor 320. For example, although a radar may have a 10 MHz pulse repetition rate its scan point rate (corresponding to processed image data) may be just 10 Hz. Each scan point corresponds to a column of image data in image 330 as shown in FIG. 3.

To compensate for a range translation of GPR 300 while it scans, an estimate of the range translation needs to be calculated. More specifically, by knowing the estimated degradation of radar range from a constant range scan at every scan point, the captured radar reflection waveforms associated with that point can be shifted in time (equivalent to a translation in range) to eliminate the impact of radar range motion. Consequently, the RF image will only show the surface unevenness without any artificial distortion in surface or targets behind or underneath it.

Figure 4:
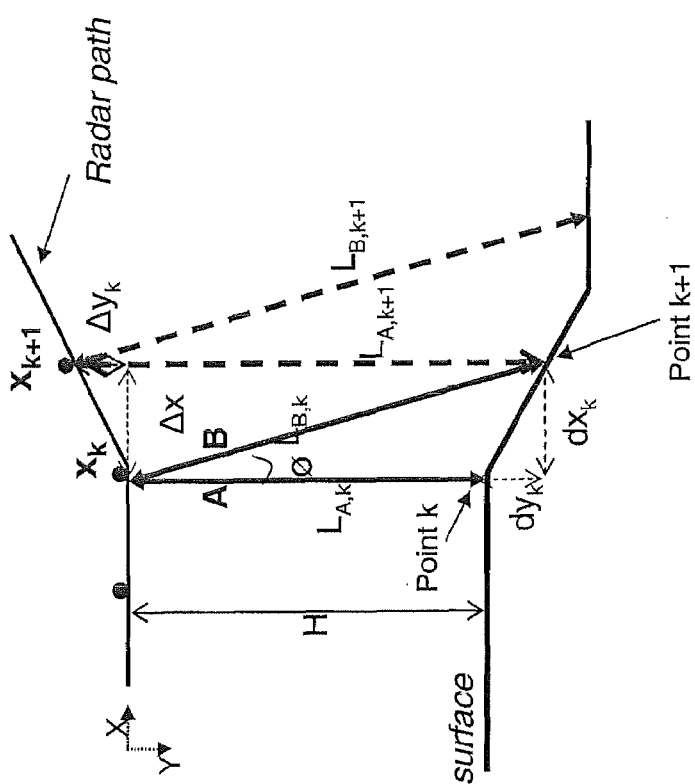
FIG. 4 illustrates the relationship between laser beam range paths for adjacent scan points for a scan where a radar scan step coincides with a laser scan step.

To provide this compensation, two laser range finder sources designated as source A and source B are provided that generate laser beams A and B, respectively (it will be appreciated that a single radar source may be used such that the laser beam emanating from this source is split to form both beams A and B). Turning now to FIG. 4, the interaction of laser beam A and B with the ground is illustrated during a radar scan. The sources are oriented such that laser beam A illuminates the ground surface within the current scan spot (or as close to this scan point as possible) whereas laser beam B is forward looking with respect to the laser beam A propagation direction by an angle φ Laser beam B is thus illuminating the ground surface within a future scan spot. Similar to radar pulses, the laser beam is transmitted to the target; but it does not penetrate the ground, wall, or other obstructions hiding the buried target and is reflected from the ground surface to the laser range finder source. GPR 300 is configured to use the resulting round-trip propagation time for the laser sources to accurately calculate the distance to the surface, given that the laser beam travels at the speed of light. This method is known and widely used in laser range finders. The following discussion will assume without loss of generality that the x direction is the scan direction whereas the y direction corresponds to the target range. At every scan point $x_k$, the laser beam round-trip time is employed to calculate the distance from the scan point to the surface being scanned. The range between the laser range finder and the illuminated spot for laser beam A is denoted as $L_{A,k}$ whereas the range for laser beam B is $L_{B,k}$. It will be appreciated that the laser range finder source(s) should be co-located with the radar antenna. If these sources are displaced from the radar antenna, the following discussion for range compensation may be readily altered to account for such displacements. The laser beam B should be directed such that it is within the scan direction/range direction plane (in this example, the x,y plane) In this fashion, $L_{A,k}$ is essentially in the same direction as radar scan beam direction and suffers from same errors due to radar vibration or drift as the radar waveform. In general $L_{A,k}$ is made of three components: initial range to the surface (H), changes in surface level (dy) with respect to the previous scan point, and translations in radar position with respect to range ($\Delta y$). The following algorithm describes how to estimate the last component ($\Delta y$) and remove it from the measured distance ($L_{A,k}$). More specifically, an estimate ($\Delta \tilde{y}_k$) is removed from the radar captured waveform associated with point k to eliminate the range translations of the radar from the final image.

The initial range of the radar antenna (assuming the laser range finder sources are co-located with the antenna) with respect to the ground is designated by a height H. By knowing $L_{A,k}$ and $L_{B,k}$, a distance $dx_k$ and a distance $dy_k$ are calculated as:

$$dx_k = L_{B,k} \cdot \sin(\phi) \tag{1}$$

$$dy_k = L_{B,k} \cdot \cos(\phi) - L_{A,k} \tag{2}$$

where $dy_k$ represents the change in the land surface height at point k+1 relative to point k. By moving the radar from point k=0 to n, a set of surface differential coordinates $\{(dx_k, dy_k) | k=0:n\}$ is thus produced. For simplification, let's assume that for $0 \leq i \leq n$, $dx_i = \Delta x_i$, where $\Delta x_i$ is the translation of the radar in the X direction (scan direction) between scan points resulting from the scan speed (X-directed translation over time) of the radar. Then at every point k+1:

$$\Delta \tilde{y}_k = L_{A,k+1} - L_{A,k} - dy_k \tag{3}$$

which is an estimate of $\Delta y_k$. This gives us a set of differential coordinates for the radar scan path as $\{(\Delta x_k, \Delta \tilde{y}_k) | k=0:n\}$. Starting from point k=0, the algorithm is initialized with $\tilde{y}_0 = H$, where H is the initial starting range between the radar antenna and the ground surface within the initial scan point. Then the estimated radar scan path is recursively computed as:

$$\tilde{y}_k = \tilde{y}_{k-1} + \Delta \tilde{y}_k \tag{4}$$

By estimating the radar scan path as described, radar waveforms are adjusted in range (Y direction) accordingly to eliminate the impact of radar scan path range translations. In other words, every pixel $p(x_i, y_j)$ in the image is shifted as:

$$p(x_i, y_j) = p(x_i, y_j - \Delta \tilde{y}_i) \tag{5}$$

This means that the effect of radar motion ($\Delta y_k$) is removed from the image and the new image will only accommodate the effect of surface unevenness.

In a more general case, $dx_i \neq \Delta x_i$, i.e. the radar scan step (which is a function of scan speed) is not the same as the horizontal distance between the ground surface interceptions of laser beams A and B. In this case $L_{A,k+1}$ in equation (3) does not coincide with the distance between the laser beam B intersection on the surface and the radar and therefore:

$$\Delta \tilde{y}_k - \Delta y_k = \text{Error}_{y,k} > 0 \tag{7}$$

$$\Delta \tilde{x}_k - \Delta x_k = \text{Error}_{x,k} > 0 \tag{8}$$

This error becomes crucial if the scan step of the radar $\Delta x^R$ (i.e. the distance between consecutive scan points) is significantly greater than the dimensions of the surface ruggedness.

In practice, this will only remove part of the radar motion effect from the image and could also introduce new artifacts as well.

Figure 5:
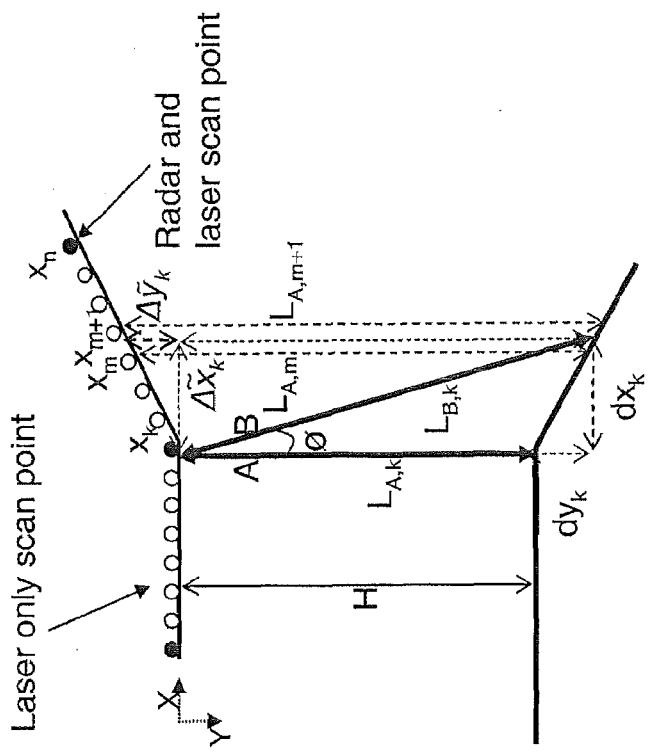
FIG. 5 illustrates the relationship between laser beam range paths for adjacent scan point for a scan where a radar scan step is larger than a laser scan step.

To reduce this error, a scan step of the laser beams, $\Delta x^L$ should be much smaller than a scan step of the radar, $\Delta x^R$. This is readily accomplished since the scan point rate is typically relatively slow such as the 10 Hz rate discussed earlier. The range calculations from the laser range sources need only be clocked at a higher rate than the scan point rate. This results in a high resolution laser scan of the surface and a lower resolution radar scan of the same area as shown in FIG. 5. Because of the higher laser scan rate, there are laser scan points between the radar scan points (the radar scan points also being laser scan points). In this case equation (3) can be rewritten as:

$$\Delta \tilde{y}_k = (a \cdot L_{A,m} + b \cdot L_{A,m+1}) - L_{A,k} - dy_k \tag{9}$$

Here $L_{A,m}$ and $L_{A,m+1}$ are vertical distances computed from beam A at points $x_m$ and $x_{m+1}$ where:

$$x_m = MAX\{x_i | x_i \leq x_k + dx_k, i > k\} \tag{10}$$

and a and b are coefficients of a linear interpolation of the $L_A$ value at point $x_k + dx_k$ from $x_m$ and $x_{m+1}$:

$$a = (x_{m+1} - x_k - dx_k)/(x_{m+1} - x_m) \tag{11}$$

$$b = (1-a) \tag{12}$$

Note that $dx_k$ and $dy_k$ are computed using equations (1) and (2). The radar path is estimated recursively according to equation (4). The final adjustment to the image is then performed using the pixel shift operation in equation (5).

Because the laser scan resolution is higher than the radar scan resolution, only $\Delta \tilde{y}_i$ values associated with radar scan points are required to be used in equation (5) accordingly. However, if the image is constructed with horizontal interpolation (i.e. the number of vertical lines in the image in more than actual number of scan points, and pixels are interpolated between each two horizontal pixels produced from two consecutive scans), then $\Delta \tilde{y}_i$ closest to every $x_i$ in the image (or interpolated $\Delta \tilde{y}_i$ from two closest available $\Delta \tilde{y}_j$ and $\Delta \tilde{y}_{j+1}$ where $j \leq i \leq j+1$ for better correction) is used.

Figure 6:
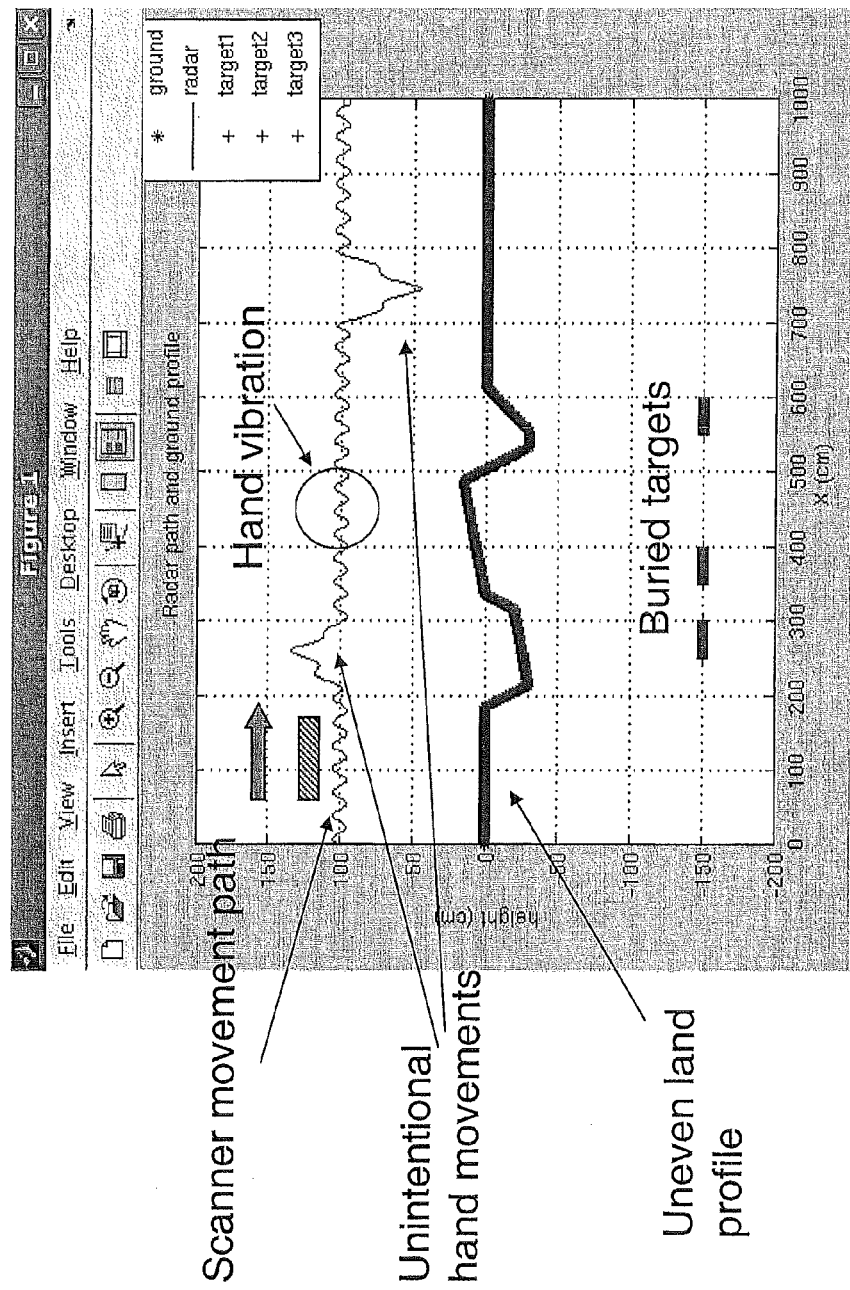
FIG. 6 illustrates a simulation scenario for demonstration of a range-translation compensation algorithm.
Figure 7A:
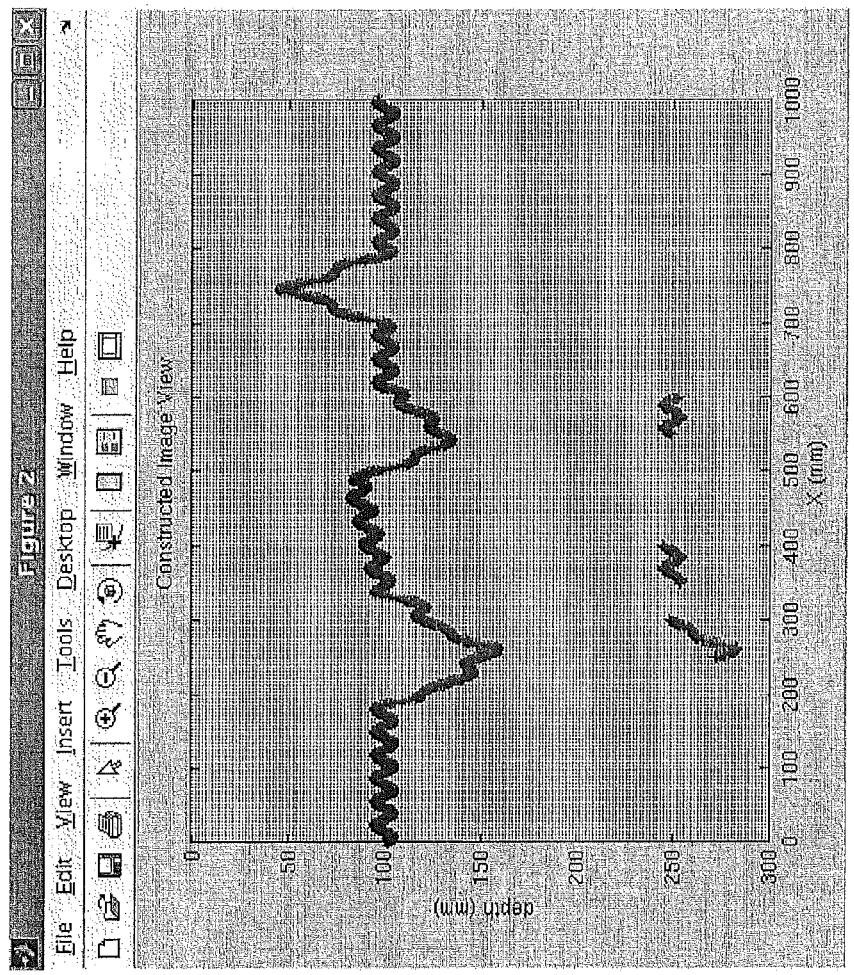
FIG. 7a illustrates a resulting simulated radar image from the scan of FIG. 6 without range-translation compensation.
Figure 7B:
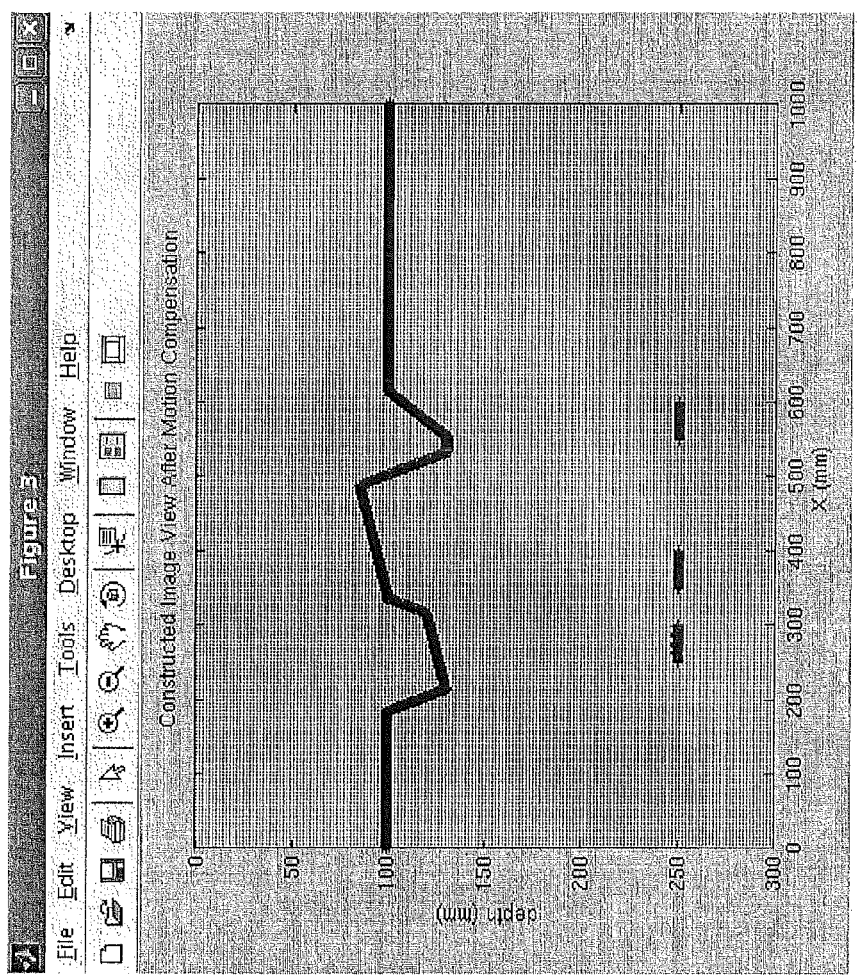
FIG. 7b illustrates a resulting simulated radar image from the scan of FIG. 6 with range-translation compensation.

Simulation results for the resulting range-translation compensation algorithm will now be discussed. FIG. 6 shows a simulation scenario in which a radar scans for three buried targets. The effect of hand shakes and sudden movements as well as ground surface profile are shown for range translations as high as 50 millimeters, which is expected to be typical for a hand-held scan scenario. FIG. 7a shows the constructed RF image prior to motion compensation. The effect of hand vibrations and sudden movements can be clearly seen both on the ground surface image and detected targets. FIG. 7b shows the image after motion compensation. Advantageously, the effects of the hand vibrations and other movements have been virtually eliminated. A forward-looking laser angle in this scenario is 1 deg.

Figure 8B:
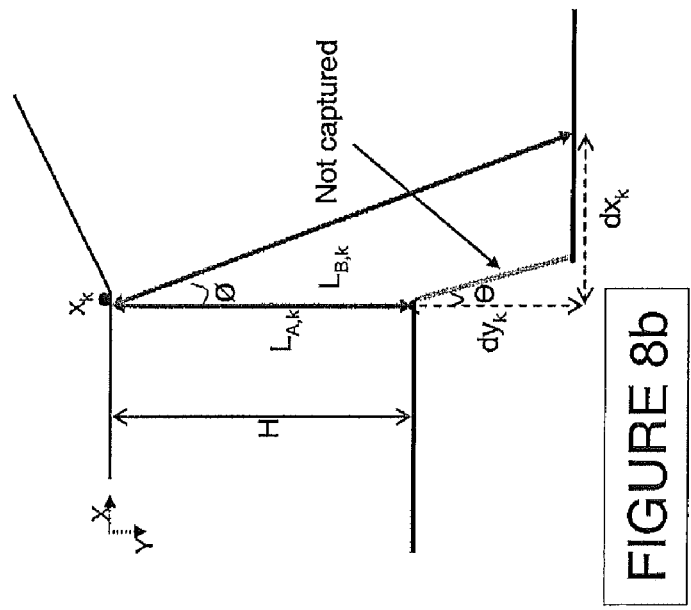
FIG. 8b illustrates the relationship between laser beam range paths for adjacent scan points for a scan where the change in surface roughness is relatively steep.
Figure 8A:
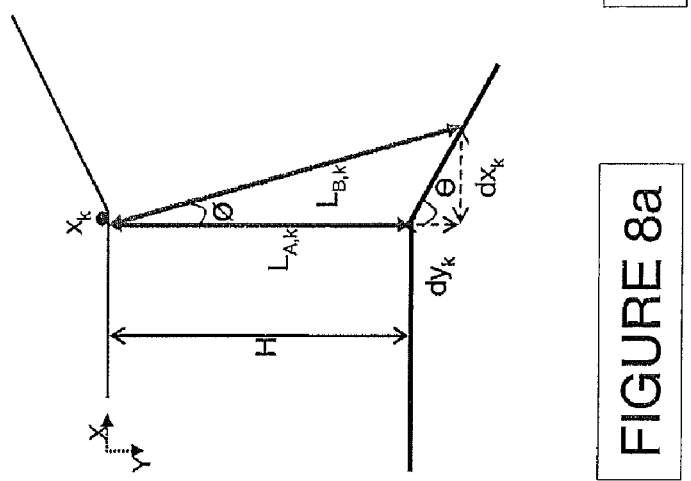
FIG. 8a illustrates the relationship between laser beam range paths for adjacent scan points for a scan where the change in surface roughness is relatively gradual.

An appropriate selection of the laser scan step size $\Delta x^L$ and the forward-looking angle $\phi$ for laser beam B will now be discussed. In equations (1) and (2), differential changes in land profile $dx_k$ and $dy_k$ are computed using the range found by two laser beams as a first step to estimate the radar range translation. In other words, the profile of the land surface is first computed and subtracted from the radar range to the surface to estimate the radar range translations. If the angle $\phi$ is not small, sharp edges of the land surface profile will not be captured with respect to a surface ruggedness angle. For example, FIG. 8a shows the laser beam A and B with $\phi<\theta$, where θ is the surface ruggedness angle. However, in FIG. 8b, the relationship is φ>θ such that an edge in the surface is not captured as shown. It may thus be seen that forward-looking angle φ limits the steepest forward angle of the surface ruggedness that can be captured and detected. This results in an error in motion estimation around sharp surface angles. On the other hand, by decreasing φ, dx will shrink which requires higher resolution in laser scan step ($\Delta x^L$). To accurately estimate the radar motion profile, we can choose $\Delta x^L < H \cdot \tan(\phi)$. For example, in order to scan from 1 m distance with φ=1 deg, laser scan step should be smaller than 1.75 cm. As discussed previously, such a laser scan step may be readily achieved because the laser range finding process is much faster than the scan step processing speed for GPRs (such as 10 Hz). Accordingly, the laser range finders may be clocked as necessary to obtain laser range findings.

In addition to compensating for range translation of a radar, variations from a constant scan speed should also be addressed. In an image construction from a radar scan, the horizontal distance between scan points ($\Delta x_k$) is assumed to be constant. In practice, the radar transmits and captures the reflections periodically according to a preset scan frequency (such as the 10 Hz discussed previously). Therefore the time (T) between two consecutive scans is constant. An operator of the radar scan then tries to slide the radar over the target at a constant speed, denoted as v. Ideally this leads to a constant scan point step, Δx along the scan path:

$$\Delta x = v/T \qquad (13)$$

This quantity is then used to scale the horizontal axis of the RF image. In other words, the distance between every two vertical image portions (prior to horizontal interpolation) in the RF image is scaled to Δx. However, if v varies along the scan path, the actual $\Delta x_k = v_k/T$ between two vertical lines k and k+1 is not the same as Δx. Therefore the image will horizontally shrink at areas where $\Delta x_k > \Delta x$ and stretch at locations where $\Delta x_k < \Delta x$. If $\Delta x_k$ can be estimated along the path, this value can be used in image construction between two vertical image lines k and k+1, rather than Δx. This results in a correct horizontal scaling of image between every two consecutive scans, which mitigates the smearing and skewing effect of speed variations.

To compensate for the impact of non-constant scan speed, a radar should record the time and position of every scan point. Referring back to FIG. 3, an accelerometer 350 may be integrated in radar 300 to enable accurate computation of position along the scan path. As known in the arts, an accelerometer is a device for measuring acceleration and gravity induced reaction forces. Single- and multi-axis models are available to detect magnitude and direction of the acceleration as a vector quantity. Modern accelerometers are often small micro electro-mechanical systems (MEMS), and are indeed the simplest MEMS devices possible, consisting of little more than a cantilever beam with a proof mass (also known as a seismic mass) and some type of deflection-sensing circuitry. Under the influence of gravity or acceleration the proof mass deflects from its neutral position. The deflection is measured in an analog or digital manner. Another type of MEMS-based accelerometer contains a small heater at the bottom of a very small dome, which heats the air inside the dome to cause it to rise. A thermocouple on the dome determines where the heated air reaches the dome and the deflection off the center is a measure of the acceleration applied to the sensor. Single-axis, dual-axis, and triple-axis models exist to measure acceleration as a vector quantity or just one or more of its components. MEMS accelerometers are available in a wide variety of measuring ranges, reaching up to thousands of g's.

Miniature MEMS accelerometers and gyros are offered by different vendors and can be integrated to the radar through standard digital interface such as SPI or I²C. In one embodiment, radar 300 could thus determine the acceleration captured at every scan point. To compensate for the effect of speed in the scan direction, only acceleration along the x axis ($a_x$) is required. Radar 300 could determine the x location of each scan spot using the following equation:

$$x = x_0 + \iint a_x(t) \cdot dt \qquad (14)$$

where $a_x(t)$ is the acceleration along the x axis at time t. In a discrete implementation, at every point k, radar 300 records the time and acceleration as $t_k$ and $a_{x,k}$. Starting with initial condition $t_0=0$, $x_0=0$ and $v_{x,0}=0$, a scan step estimate $\Delta \tilde{x}_k$ is recursively calculated using the following equations (15)-(18):

$$\Delta t_k = t_k - t_{k-1} \qquad (15)$$

$$\Delta v_{x,k} = a_{x,k} \cdot \Delta t_k \qquad (16)$$

$$V_{x,k} = v_{x,k-1} + \Delta v_{x,k} \qquad (17)$$

$$\Delta \tilde{x}_k = v_{x,k} \cdot \Delta t_k \qquad (18)$$

By computing $\{\Delta \tilde{x}_k | 0 < k < n\}$, radar 300 may then adjust the horizontal distance between every two scans. Analogously as discussed for the laser-aided compensation method, the resolution of the captured accelerometer values should be sufficiently high to accurately estimate $\Delta \tilde{x}_k$, even if the scan resolution is lower.

Rather than calculate range translations using laser range finders, the range scan variation compensation using acceleration measurements method just described can be extended to compute the estimate of $\Delta y_k$ by using an accelerometer along the y axis using the following equations recursively with initial conditions $t_0=0$, $y_0=H$ and $v_{y,0}=0$:

$$\Delta t_k = t_k - t_{k-1} \qquad (19)$$

$$\Delta v_{y,k} = a_{y,k} \cdot \Delta t_k \qquad (20)$$

$$V_{y,k} = v_{y,k-1} + \Delta v_{y,k} \qquad (21)$$

$$\Delta \tilde{y}_k = v_{y,k} \cdot \Delta t_k \qquad (22)$$

It will be appreciated that the range translation and scan speed variation compensation techniques discussed herein may be widely applied to any radar that is physically translated with respect to some surface during a scan. In that regard, the above-described embodiments are merely meant to be illustrative and are not limiting. It will thus be obvious to those skilled in the art that various changes and modifications may be made to these embodiments. The appended claims encompass all such changes and modifications as fall within the true spirit and scope of this invention.

I claim:

1. A radar range translation compensation method, comprising:
    scanning a radar in a first direction with respect to a surface of a substrate, the radar being configured to construct an image of a target within or adjacent to the substrate according to scan points associated with the surface;
    while scanning the radar in the first direction, determining a range between the radar and a current scan point as well as determining the range between the radar and a future scan point displaced from the current scan point in the first direction;

processing the determined ranges to estimate a range translation of the radar during the scan; and constructing the image of the target according to the scan points while compensating for the estimated range translation of the radar.

2. The method of claim 1, wherein determining the range between the radar and a current scan point comprises determining the range using a first laser range finder.

3. The method of claim 2, wherein determining the range between the radar and the future scan point comprises determining the range using a second laser range finder.

4. The method of claim 3, wherein the first and second laser range finders determine ranges at a rate faster than a radar scan point generation rate.

5. The method of claim 3, wherein the first and second laser range finders determine ranges at a rate equal to a radar scan point generation rate.

6. The method of claim 1, wherein the substrate is ground, the target being buried in the ground.

7. The method of claim 1, wherein the substrate is a wall, the target being opposite an opposing side of the wall with respect to the radar.

8. The method of claim 1, wherein the radar compensates for the estimated range translation by subtracting the estimated range translation from an uncompensated image.

9. A radar compensation method, comprising:

scanning a radar in a first direction with respect to a surface of a substrate, the radar being configured to construct an image of a target within or adjacent to the substrate according to scan points associated with the surface;

while scanning the radar in the first direction, determining a first acceleration of the radar in the first direction and a second acceleration of the radar towards the surface;

processing the first and second accelerations to determine a variation of the radar from a constant scan speed and to determine a range translation of the radar with respect to the surface; and constructing the image of the target according to the scan points while compensating for the variation of the radar from the constant scan speed as well as compensating for the range translation of the radar.

10. The method of claim 9, wherein determining the accelerations comprises determining the accelerations using at least one accelerometer.

11. The method of claim 10, wherein the at least one accelerometer comprises a 2-axis accelerometer.

12. A radar configured to construct an image of a target within or adjacent to a substrate according to scan points associated with a surface of the substrate while the radar is scanned in a first direction, comprising:

a transceiver that transmits radar pulses and receives reflected radar pulses using an antenna directed at the surface; and an image processor configured to use a plurality of processed received radar pulses to generate an image portion according to each scan point; and at least one laser range finder being configured to illuminate a first surface portion within a surface portion illuminated by the antenna and to illuminate a second surface portion displaced in the first direction from the first surface portion, the laser range finder determining a first range between the laser range finder and the first surface portion and determining a second range between the laser range finder and the second surface portion, wherein the radar is configured to process the first and second ranges to determine a range translation of the radar during the scan in the first direction, and wherein the image processor is further configured to compensate the image portions according to the determined range translation so as to construct an image of the target.

13. The radar of claim 12, wherein the at least one laser range finder comprises a first laser range finder for determining the first range and a second laser range finder for determining the second range.

14. The radar of claim 13, wherein the first laser range finder is co-located with the antenna.

15. The radar of claim 13, wherein the second laser range finder is co-located with the antenna.

16. The radar of claim 12, wherein the substrate is ground and the target is buried in the ground.

17. The radar of claim 12, wherein the substrate is a wall and the target is adjacent an opposing side of the wall with respect to the radar.

* * * * *